3,787,451
EPOXIDES OF ALKOXY-SUBSTITUTED
TRI(HYDROXYPHENYL)ALKANES
Raymond W. Mah, Walnut Creek, Calif., assignor to The
Dow Chemical Company, Midland, Mich.
No Drawing. Filed Aug. 19, 1971, Ser. No. 173,257
Int. Cl. C07d 1/18
U.S. Cl. 260—348 R      3 Claims

ABSTRACT OF THE DISCLOSURE

The invention comprises polyglycidyl ethers of alkoxy-substituted tri(hydroxyphenyl)alkanes, their blends with other epoxy compounds and their cured products. These epoxides are prepared by a process wherein the coupling reaction is carried out under different conditions than the subsequent dehydrohalogenation step. The resulting epoxides demonstrate superior and unexpected combinations of high-temperature properties and flex strengths.

BACKGROUND OF THE INVENTION

A number of epoxides of non-alkoxy-substituted poly(hydroxyphenyl)alkanes are known. For instance, di-, tri- and tetra(hydroxyphenyl)alkanes have previously been reacted with compounds such as epichlorohydrin to form the glycidyl ethers thereof. These, then, have been cured to produce resins which were expected to possess widely sought high-temperature properties.

The desirability of producing epoxides from tri- and tetra(hydroxyphenyl)alkanes is noted in the art due to the availability of starting materials such as leucaurin.

Tris(4-hydroxyphenyl)methane, commonly known as leucaurin, has been prepared by the reduction of aurin with zinc dust and acetic acid. It, or its substituted derivatives, may also be prepared by the condensation of phenols with aromatic ketones or aldehydes. For instance, tri(4-hydroxyphenyl)ethane is prepared by the condensation of phenol and 4-hydroxyacetophenone (see U.S. Pat. 3,579,542). One can prepare derivatives having substituents on the phenol-derived phenyl rings by choosing the proper phenol reactant. See, for instance, copending application Ser. No. 173,259, entitled "Leucaurin Epoxides," filed concurrently herewith.

Dearborn et al. (I.E.C. 45, No. 12) produced epoxides from bi-, tri- and tetra-phenols by a process wherein the phenol, epichlorohydrin (epi) and caustic was mixed and heated, thereby coupling and dehydrohalogenating in a single operation. It has been determined that leucaurin epoxide prepared according to their method had an epoxy functionality of about 2 and relatively poor high-temperature performance (see above co-pending application). Also see U.S. Pat. 2,857,362 and 2,863,852 (Dearborn et al.), which pertain to the above-reported research.

U.S. Pat. 2,965,611 (Schwarzer) teaches the epoxidation of tri- and tetra(hydroxyphenyl)alkanes wherein not more than two epoxyalkoxyphenyl groups are on an alkylene carbon. Schwarzer's epoxidation method was similar to Dearborn's, except that the phenol-epi mixture was heated to reflux prior to the addition of aqueous caustic. However, he prepared an epoxide only from a tetrakis-compound.

British Pat. 875,811 (Neumann) prepared the tris-epoxy compound disclosed in Schwarzer by a method similar to Schwarzer except that solid caustic was used in the place of aqueous caustic.

Various methoxy-substituted leucaurin-type materials have been reported. For instance, tris(4-hydroxy-3-methoxyphenyl)methane has been prepared by the condensation of vanillin and guaiacol. Other methoxy position isomers and ethoxy analogs are described by M. Dominikiewicz (C.A. 34, 747), French Pat. 818,594, Swiss Pat. 201,182 and U.S. Pat. 2,116,827. However, no polyglycidyl ether derivatives of these compounds have been found in the art.

SUMMARY OF THE INVENTION

The present invention provides polyglycidyl ethers of alkoxy-substituted tri(hydroxyphenyl)alkanes in near theoretical yield and conversion, an efficient method of preparing same, their blends with other epoxy compounds and their cured products singularly or in combination with other epoxides.

The epoxides of this invention correspond to the formula

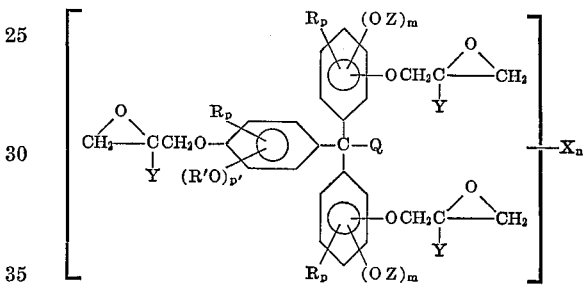

wherein Q is H or an alkyl of up to about 10 carbon atoms; each R is independently an alkyl or alkoxy of up to about 12 carbon atoms, phenyl or a cycloalkyl group of from 3 to about 6 carbon atoms; each R' is independently an alkyl group of up to 3 carbon atoms; each Y is independently H or —CH$_3$; Z is H or

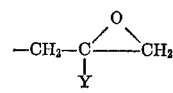

X is Cl, Br or NO$_2$; each $m$ is independently 0 or 1; each $p$ is independently 0 to 2; $p'$ is 1 or 2; and $n$ is 0 to 6.

The epoxides of the instant invention are prepared by a process as follows:

(1) A tri-phenolic compound, corresponding to the above formula (when the epoxypropoxy and (OZ)$_m$ groups are replaced by (OH)$_{m'}$, where $m'$ is 1 or 2, on the phenol-derived phenyls, and OH on the aldehyde- or ketone-derived phenyl), is combined in a suitable vessel with at least about 5 moles per hydroxyl equivalent, preferably about 10 moles per equivalent, of an epihalohydrin. The reaction is carried out in the presence of a coupling catalyst, such as benzyltrimethylammonium chloride, the reactants being heated to a temperature of from about 60° to 150° C., preferably reflux, for at least about 30 min., preferably about one hour.

(2) At the end of this period, the mixture is cooled to about 35° to 70° C. and at least about one equivalent of caustic is added per hydroxyl equivalent. That reaction mixture is then stirred for from about 0.5 to 3 hours.

The resulting epoxidation reaction product preferably has an average epoxide functionality of from at least about 2.5 to about 5, or at least 70% of theoretical for the number of available hydroxyls on the starting tri-phenolic, whichever is greater. Further, the product preferably is primarily epoxidation product and contains no more than small amounts of resinous by-products, as evidenced by an Epoxidation Efficiency Rating of from about 23 to 81 for the reaction products of this invention. Epoxidation Efficiency Rating is defined as being the ratio of product epoxy equivalent weight/average epoxide functionality. For this rating, epoxy equivalent weight is calculated from the epoxy-substituted aromatic nucleus only (i.e., where $p$, $p'$ and $n$ are 0 and Q is H in the above formula). This rating, then, is a manner for assessing the (1) efficiency of converting hydroxyls to epoxy moieties, and (2) limiting by-product formation.

The products, then, are viscous liquids or solids at room temperature, and very fluid at about 50° C.

The epoxides thusly prepared may be admixed prior to curing with other epoxides to result in a blend with desirable properties. Examples include monofunctional reactive diluents, such as phenyl glycidyl ether, allyl glycidyl ether, butyl glycidyl ether, cyclohexene monoxide, and the like; alkylene oxides, such as butylene oxide, propylene oxide, octylene oxide, and the like. Polyfunctional epoxides are also suitable, such as epoxy novolacs, liquid and solid diglycidyl ethers of dihydroxy compounds, butadiene dioxide, diglycidyl ether, cyclopentadiene dioxide, vinyl cyclohexene dioxide, bis(2,3-epoxycyclopentyl)ether, diglycidyl phthalate, diglycidyl aniline, trisepoxides from aminophenols and epi, and the like. Mixtures of the above are also suitable. U.S. Pat. 2,935,488 (Phillips et al., 1960), for example, exemplifies mixtures of epoxies suitable herein. The epoxide of this invention, alone or in combination with other resins, may then be cured under typical curing conditions with known catalysts, such as polyalkylene amines and the like.

The utility of the resins so produced are similar to other epoxides including, for example, potting, encapsulation, high performance coatings and foams, casting, tooling, high temperature wire coatings, caulking compounds, fiber-resin composites, laminates, adhesives, molding compounds, and the like.

DETAILED DESCRIPTION OF THE INVENTION

The tri-phenolics which are the precursors to the epoxides of the instant invention are generally prepared by condensing an alkoxy-substituted aromatic aldehyde or ketone, such as alkoxyhydroxybenzaldehydes or alkoxyhydroxyalkanophenones, with an excess, preferably a large excess, of a substituted or unsubstituted phenol.

The reactant mixture is stirred, often with heating, and with introduction of a strong acid, such as $H_2SO_4$, HCl or HBr, as catalyst. The ensuing reaction is exothermic and after the exotherm subsides the predetermined reaction temperature is established and continued until the reaction reaches substantial completion. Isolation of the product is carried out by conventional techniques and procedures.

As is indicated in the above formula, the alkoxy-substituted tri(hydroxyphenyl)alkanes suitable herein for epoxidation may be substituted on the phenol-derived phenyls in any position, and may contain substituents such as Cl, Br or $NO_2$. It will be clear to those skilled in the art that the presence of certain substituents, notably meta-directing groups, may tend to inhibit the condensation of phenols and aldehydes or ketones to tri-phenolic materials. In that case, condensation is carried out first and the product then substituted. Nitration and halogenation are examples. However, it is advisable to carry out such substitutions prior to epoxidation, due to the vulnerability of the oxirane rings to opening, thereby destroying their functionality.

By the use of a substituted phenol or by the condensation to the three ring structure followed by introduction of desired substituents, precursors with a wide range of substituents upon the phenol-derived phenyl rings are conveniently provided. These compounds may then be easily epoxylated. For example, good results have been obtained when using o-methoxyphenol, o-cyclohexylphenol, o-cresol, o-hexylphenol, 2-methylresorcinol, 4-dodecylresorcinol, p-cresol, p-tertiary butylphenol, o-phenylphenol, m-cresol, and the like.

The epoxide, then, is generally formed by first causing a tri-phenolic to couple with an epihalohydrin in the presence of a coupling catalyst under those conditions previously given. Suitable catalysts include benzyltrimethylammonium halides, such as the chloride; tertiary amines, such as benzyldimethylamine, triethylamine, N,N,N',N'-tetramethylethylenediamine and the like; N-methylmorpholine; triphenylphosphonium halides, such as the iodide, bromide or chloride; triphenylethylphosphonium diethyl phosphate and other corresponding ionic salts including phosphonates, acetates, nitrates and the like. The preferred catalyst is benzyltrimethylammonium chloride (BTMAC).

After a sufficient time has elapsed to insure the desired degree of coupling of epi groups to hydroxyls, the reaction mixture is cooled to the afore specified temperature range. Dehydrohalogenation is then brought about by the use of a base, such as NaOH, NaOH in saturated $Na_2CO_3$ solution, sodium aluminate or the like. 3 N NaOH is suitable, as is 30–50% NaOH added slowly to the solution with azeotropic removal of $H_2O$. One could also use 20% alcoholic KOH at reflux. 3 N NaOH in saturated $Na_2CO_3$ is preferred.

The reactant used to introduce the epoxyalkoxy group, by which the tri-phenolics of this invention are converted to their corresponding glycidyl ethers, is usually epichlorohydrin. However, epibromohydrin, 1-chloro-2,3-epoxy-2-methylpropane and the like are also suitable.

In more detail, the epoxides of this invention are prepared by placing the phenol (preferably 4,4',4''-trihydroxy-3-methoxy-triphenylmethane), an epihalohydrin (preferably epichlorohydrin) and a condensation catalyst in a suitable flask equipped with a stirrer, thermometer and reflux condenser. The reaction mixture is then heated to reflux for about one hour. Thereafter, the flask is cooled to about 50° C., such as in a water bath, and, while maintaining that temperature, aqueous caustic in saturated $Na_2CO_3$ is added with stirring. At least one equivalent of caustic per phenolic hydroxyl equivalent should be utilized, and it is preferred to use a slight stoichiometric excess.

At the end of an hour, during which the caustic addition is completed and heating and stirring are continued, the resulting mixture is permitted to segregate into organic and aqueous phases, and the aqueous phase removed. The remaining organic phase is then returned to the water bath, heated to 50° C. and stirring is continued while sodium hydroxide in saturated aqueous sodium carbonate solution is again added.

Heating and stirring are then continued at 50° C. for another hour, at the end of which time the aqueous phase is again removed. The resulting organic phase is washed once with water made slightly acid with acetic acid, and washed thereafter with water alone until the eluent is neutral to pH paper. If desired, the wash water may contain some sodium chloride to diminish the tendency of water to emulsify in the organic phase. Upon completion of water-washing, the resulting organic material is distilled under sub-atmospheric pressure to remove traces of water and unreacted epichlorohydrin. As a result of these procedures there is obtained, for example, a tri-epoxypropoxy derivative of the tri-phenolic which has measured molecular and epoxy equivalent weights close to theoretical.

The most preferred epoxy product of this invention is 4,4',4" - tri(2,3-epoxypropoxy)-3-methoxy-triphenylmethane, preferably having an epoxy equivalent weight of from about 158 to 175, an average epoxide functionality of about 2.8 to 3.2 (Epoxidation Efficiency Rating of about 47 to 58), and a viscosity of from about 25,000 to 50,000 cps. at 60° C.

A further preferred species is tris(3-methoxy-4(2,3-epoxypropoxy)phenyl)methane, preferably having an epoxy equivalent weight of from about 175 to 210, an average epoxide functionality of about 2.8 to 3.2 (Epoxidation Efficiency Rating of about 52 to 78).

The polyepoxides of this invention may be blended with various other epoxies as is discussed above. For instance, they may be admixed with epoxy novolac resins to give a blend with a lower viscosity than that of the novolac alone, without sacrificing functionality and, consequently, with substantial retention of the physical and chemical properties of the cured epoxides of this invention. Likewise, these polyepoxides can be blended with liquid and solid diglycidyl ethers of dihydroxy compounds to slightly increase the cross-linking density of the cured product. By such blends it is possible to adjust the properties of a resin to those desired, generally enhanced flex strengths, without imposing any fabrication difficulties. The flexibility of this concept is exemplified in that the blends can be achieved by mixing the polyepoxides before curing or by blending the phenolic reactants before epoxidation. The possible combinations are innumerable. By utilizing as little as about 5 wt. percent of the epoxides of this invention, the properties of the above epoxides may be enhanced.

The polyepoxides of this invention are generally useful in the same areas as other epoxy resins, as outlined above.

The polyepoxides produced according to the teachings herein may be cured by typical agents under known conditions. It has been found that the following curing agents are quite suitable: methylene dianiline, m-phenylenediamine, and mixtures thereof; o- and p-phenylenediamines; benzidine; diaminodiphenylsulfone; 2,6-diaminopyridine; benzyldimethylamine; tetramethylethylenediamine; N-methylmorpholine; diethylenetriamine; triethylenediamine; tetramethylguanidine; dicyandiamide; dimethylethanolamine; diethanolamine; trialkylamines, such as triethylamine, tripropylamine and tributylamine; 4-picoline; and the like. Also suitable are $BF_3$ complexes, such as $BF_3$ monoethylamine; borates, such as tricresyl borate; anhydrides, such as Nadic methyl anhydride, hexahydrophthalic anhydride, dodecenyl succinic anhydride, succinic anhydride, maleic anhydride, phthalic anhydride, glutaric anhydride, pyromellitic dianhydride, trimellitic anhydride, tetrahydrophthalic anhydride, chlorendic anhydrides, polysebacic polyanhydrides, polysulfides, polyazalaic anhydride, benzophenonetetracarboxylic acid dianhydride, cyclopentanetetracarboxylic acid dianhydride, and the like.

All of these curing agents can be cured with the epoxides of this invention over a wide range of temperatures depending upon the properties desired and the curing agent used. One could use, for instance, 2 hours at 120° for a very moderate cure of the aromatic amines, tertiary amines, $BF_3$ complexes, borates, and the readily soluble or lower melting anhydrides. For optimum properties, step-curing is most suitable, such as 16 hours at 85° C. plus 16 hours at 160° C., or 16 hours at 85° C. plus 16 hours at 160° C. plus 4 hours at 230° C. The shortest possible curing times are, of course, desirable, and high heat distortion temperatures can be achieved by curing 2 hours at 230° C. with such curing agents as methylene dianiline, meta-phenylenediamine, benzidine, diaminodiphenylsulfone, $BF_3$ complexes, maleic anhydride-tri-mellitic anhydride mixtures, maleic anhydride-pyromellitic anhydride mixtures, hexahydrophthalic anhydride-trimellitic or pyromellitic anhydride mixtures, phthalic anhydride mixed with trimellitic, or pyromellitic anhydride. Other anhydrides, such as cyclopentanetetracarboxylic acid dianhydride or benzophenonetetracarboxylic acid dianhydride mixed with maleic, phthalic, or hexahydrophthalic anhydrides, can also be used. Or, the high melting anhydrides can be used alone if they are milled into the resin to achieve complete dispersion.

Because of their outstanding combination of flex strength and heat distortion temperature and heat resistance, as well as other superior properties, these epoxy resins are suitable for use in many specialized fields of application.

In the area of glass reinforced epoxies, they find application in high temperature ablative heat shields and nose cones as well as rocket motor cases and thrust chambers. Other uses are in glass laminates requiring high hot strength such as printed circuit boards. Since the cured products have outstanding chemical and solvent resistance, they can be used in epoxy-fiberglass pipe which will also have higher hot strengths than possible before. This is also true of pressure spheres and tanks requiring chemical, solvent and/or heat resistance. Hoods, stacks, and support members of epoxy glass requiring greater acid, caustic, or solvent resistance are other possibilities.

These epoxides may also be used in structural composites with carbon fiber, boron fiber or glass fiber for aircraft for which greater heat resistant components are now required.

In the electrical field these compositions, with proper curing agents, give cured formulations with higher heat resistance and hot strength than available before, low dielectric constants, high resistivity, low electrical loss, and superior arcing and tracking resistance.

Coatings based on or utilizing these new epoxies achieve greater chemical, heat, or solvent resistance. This is true for non-solvent coatings as well as for coatings based on fatty acid esters such as tung, dehydrated castor, or linseed.

These epoxides are also an excellent base for the more recently developed epoxy acrylate or other highly chemical resistant vinyl ester resins.

High temperature adhesives is an area in which the compounds of this invention are especially useful.

SPECIFIC EMBODIMENTS

Example 1

4,4',4"-trihydroxy-2,2'-dimethyl - 3" - methoxy - triphenylmethane was prepared in order to demonstrate a method of preparing the epoxide precursors.

To a solution of vanillin (4-hydroxy-3-methoxy-benzaldehyde 100 g., 0.65 mole) and m-cresol (702 g., 6.5 moles) in glacial acetic acid (600 ml.), chilled to 4° C., was slowly added, with stirring, a sulfuric acid/glacial acetic acid (100 ml./300 ml.) catalyst solution (precooled to 4° C.).

The resulting deep red solution was stirred for an additional several minutes, then stored at 4° C. for a period of 3 days.

Addition of water (2.5 liter) to the reaction solution yielded a suspension of solids that was dissolved and extracted with diethyl ether. The organic phase was neutralized with aqueous sodium bicarbonate and washed several times with saturated sodium chloride solution.

Ether and most of the unreacted m-cresol was removed by distillation under reduced pressure. The residual mass was subjected to steam distillation to liberate the last traces of m-cresol. The solid product mass was crushed under water, filtered, washed freely with fresh water, and dried. The yield was 200 g. of dried product; analysis by Gel Permeation Chromatography (GPC) indicated 95% purity of the desired structure.

The procedure described above was used to prepare the following triphenylmethane derivatives:

(a) 4,4',4''-trihydroxy-3,3'-diphenyl-3''-methoxy-triphenylmethane (from vanillin and 2-phenylphenol)—62% yield;
(b) 4,4',4''-trihydroxy-3,3'-dicyclohexyl-3''-methoxy-triphenylmethane (from vanillin and 2-cyclohexylphenol)—63% yield;
(c) 2,2',4''-trihydroxy-5,5'-dimethyl-3''-methoxy-triphenylmethane (from vanillin and p-cresol)—>50% yield;
(d) 2,4',4''-trihydroxy-3-methoxy-triphenylmethane (from 2-hydroxy-3-methoxy-benzaldehyde and phenol)—84% yield;
(e) 2,4',4''-trihydroxy-5-methoxy-triphenylmethane (from 2-hydroxy-5-methoxy-benzaldehyde and phenol)—70% yield;
(f) 4,4',4''-trihydroxy-3-methoxy-triphenylmethane (from vanillin and phenol)—89% yield;
(g) 4,4',4''-trihydroxy-3,3',3''-trimethoxy-triphenylmethane (from vanillin and 2-methoxyphenol)—>50% yield; and
(h) 4,4',4''-trihydroxy-3,3'-diisopropyl-5,5'-dimethyl-3''-methoxy-triphenylmethane (from vanillin and 5-methyl-2-isopropyl-1-phenol)—>50% yield.

EXAMPLE 2

2,2',4,4',4'' - pentahydroxy-5,5'-di-n-hexyl-3''-methoxy-triphenylmethane was prepared by the following procedure:

To an anhydrous ethereal solution of zinc chloride (100 g. in 300 ml. ether) was added 4-n-hexylresorcinol (175 g.; 0.9 mole). After this mixture was gently heated to form a solution, vanillin (63 g.; 0.41 mole) was added in one portion. The reaction mixture was stirred and maintained at reflux temperature for a period of three hours; then stirred at room temperature overnight.

The workup procedure required addition of more ether to the reaction mixture. The organic solution was washed with water (4× 250 ml.) and distilled under reduced pressure. The crude product (yellow solids) was recrystallized from benzene. Yield was 126 g. (60%) of off-white solid 2,2',4,4',4''-pentahydroxy - 5,5'-di-n-hexyl-3''-methoxy-triphenylmethane.

The product was analyzed by GPC and exhibited an elution volume consistent with the expected structure.

EXAMPLE 3

1,1,1 - ((4,4',4'' - trihydroxy-3-methoxy)-triphenyl)ethane was prepared as follows:

A one-liter, 3-neck round bottom flask, equipped with mechanical stirrer and sparger, for entry of HCl, was charged with phenol (282 g. 3 moles), 4-hydroxy-3-methoxyacetophenone (acetovanillin)(50 g., 0.304 mole) and thioglycoloic acid (5.6 g., 0.06 mole) as catalyst. The mixture was heated to 45° C., then hydrogen chloride was slowly passed through the stirred reaction mixture over a period of 4 hours, during which time the temperature was maintained at 50–55° C. with external heating.

The cooled reaction mixture was removed from the flask, assisted by the use of diethylether (300 ml.), to form an organic solution. The solution was washed with several portions of water, and ether was removed by distillation under reduced pressure. Excess phenol present with the product was liberated by distillation in vacuo, followed by a steam distillation.

The procedure yielded 50 g. (50%) of a product which was characterized by GPC as the expected tri(hydroxyphenyl)ethane.

EXAMPLE 4

Tris(3-methoxy - 4 - (2,3-epoxypropoxy)phenyl)methane was prepared as follows:

To 382 g. of 4,4',4''-trihydroxy-3,3',3''-trimethoxy-triphenylmethane (one mole, 3 equivalents) was added 2780 g. of epichlorohydrin (30 equivalents) and 2.9 g. of benzyltrimethylammonium chloride (60% solution) (1 equivalent percent). The solution was heated to reflux (119° C.) for one hour to complete the coupling. The solution was treated for an hour at 50° C. with 984 ml. of 3 N NaOH in a saturated $Na_2CO_3$ solution (1 equivalent). The spent alkaline brine was separated and discarded. The epoxy intermediate was then treated with 516 ml. of the 3 N NaOH-saturated $Na_2CO_3$ solution (0.5 equivalent) at 50° C. for another hour. The spent alkaline brine was separated and the epichlorohydrin solution was washed repeatedly with water until the washings were neutral.

The epichlorohydrin solution was dried over anhydrous sodium sulfate, and filtered. Epichlorohydrin was removed by distillation under reduced pressure. The residual resin exhibited an epoxy equivalent weight of 200 (theory 183.5), and was judged to be desired triepoxy derivative of 4,4',4''-trihydroxy-3,3',3''-trimethoxy - triphenylmethane according to analysis by GPC.

Polyepoxy derivatives of other triphenylmethanes can be prepared from a similar procedure. Table I lists the derivatives that were synthesized:

TABLE I

| Phenolic | Amount of epichlorohydrin used, g. | Yield of polyepoxide | Epoxy equivalent weight Theory | Epoxy equivalent weight Found |
|---|---|---|---|---|
| 1 4,4',4''-trihydroxy-2,2'-dimethyl-3''-methoxy-TPM¹ (150 g., 0.428 mole). | 1,190 | 200 g. (91%) | 173.8 | 182 |
| 2 4,4',4''-trihydroxy-3,3'-diphenyl-3''-methoxy TPM (200 g., 0.421 mole). | 1,170 | 249 g. (93%) | 215.2 | 231 |
| 3 4,4',4''-trihydroxy-3,3'-dicyclohexyl-3''-methoxy TPM (140 g., 0.289 mole). | 803 | 182 g. (97%) | 219.2 | 234 |
| 4 2,2',4''-trihydroxy-5,5'-dimethyl-3''-methoxy-TPM (84 g., 0.24 mole). | 690 | 109 g. (88%) | 173.8 | 234 |
| 5 4,4',2''-trihydroxy-3''-methoxy-TPM (76 g., 0.246 mole) | 560 | 106 g. (88%) | 163.0 | 176 |
| 6 4,4',2''-trihydroxy-5''-methoxy-TPM (60 g., 0.186 mole) | 516 | 86 g. (95%) | 163.0 | 174 |
| 7 4,4',4''-trihydroxy-3-methoxy-TPM (75 g., 0.232 mole) | 760 | 97 g. (86%) | 163.0 | 170 |
| 8 4,4',4''-trihydroxy-3,3',3''-trimethoxy TPM (480 g., 1.24 mole). | 3,555 | 430 g. (65%) | 183.5 | 200 |
| 9 4,4',4''-trihydroxy-2,2'-dimethyl-5,5'-diisopropyl-3''-methoxy-TPM (100 g., 0.230 mole) | 560 | 112 g. (81%) | 200.9 | 210 |
| 10 2,2',4,4',4''-pentahydroxy-5,5'-di-n-hexyl-3''-methoxy-TPM (97 g., 0.189 mole). | 940 | 139 g. (93%) | 161.5 | 173 |
| 11 1,1,1-((4,4',4''-trihydroxy-3-methoxy)-triphenyl)ethane (45 g., 0.134 mole). | 367 | 54 g. (80%) | 178.4 | 185 |

EXAMPLE 5

The glycidyl ethers of this invention were then cured as below:

Sixty grams of tris(3-methoxy-4-(2,3-epoxypropoxyphenyl))methane (the tri glycidyl ether derivative of 4,4',4'' - trihydroxy-3,3',3''-trimethoxy-triphenylmethane) was mixed with 14.85 g. of methylene dianiline (MDA)-(1 equivalent MDA/equivalent of the glycidyl ether). The mixture was gently heated, being maintained at temperature below 75° C. while stirring. The solution was then degassed under vacuo, poured into molds that were preheated to 50° C. The samples were cured by allowing them to remain at 100° C. for two hours, followed by a period of sixteen hours at 180° C.

The resulting resin had a heat distortion temperature (HDT) of 221° C., a Barcol hardness of 60, flex strength of 20,000 p.s.i. and flex modulus of 539,000 p.s.i. (ASTM D790–66 used throughout). Heat distortion temperature was determined by thermal mechanical analysis, as discussed in Perkin-Elmer Industrial News 20, No. 4 (1970), pages 6 and 7, as adapted to DuPont thermal mechanical analyzer utilizing same size sample (0.3" x 0.2" x 0.02").

Other epoxides were cured and tested in a similar fashion. It is to be noted that sample No. 1 in the table is a non-alkoxy-substituted leucaurin epoxide for comparison purposes. The results are given in Table II below:

TABLE II

| Epoxide | Amount of MDA used— Equiv. MDA/ equiv. TPM | HDT, ° C. | Barcol hardness | Flex Strength (p.s.i.) | Flex Modulus (p.s.i.) |
|---|---|---|---|---|---|
| Leucaurin tri-epoxide | 1.0 | 358 | 45 | 12,500 | 460,000 |
| 4,4',4"-trihydroxy-3-methoxy-TPM [1] (tri-epoxode) | 1.0 | 267 | 48 | 16,300 | 611,000 |
| 2,2',4,4',4"-pentahydroxy-5,5'-di-n-hexyl-3"-methoxy-TPM (penta-epoxide) | 1.5 | 303 | 41 | 11,200 | 406,000 |
| 4,4',4"-trihydroxy-3,3',3"-trimethoxy-TPM (tri-epoxide) | 1.0 | 221 | 60 | 20,000 | 539,000 |
| 4,4',4"-trihydroxy-3,3'-diphenyl-3"-methoxy-TPM (tri-epoxide) | 0.5 | 241 | 47 | 15,500 | 587,000 |
| 4,4',4"-trihydroxy-2,2'-dimethyl-3"-methoxy TPM (tri-epoxide) | 1.5 | 234 | 50 | 16,800 | 528,000 |
| 4,4',4"-trihydroxy-3,3'-dicyclohexyl-3"-methoxy TPM (tri-epoxide) | 1.0 | 243 | 46 | 13,800 | 537,000 |
| 4,4',2"-trihydroxy-5"-methoxy-TPM (tri-epoxide) | 1.0 | 247 | 44 | 12,500 | 431,000 |
| 4,4',2"-trihydroxy-3"-methoxy TPM (tri-epoxide) | 1.0 | 262 | 45 | 5,900 | 418,000 |
| 4,4',4"-trihydroxy-2,2'-dimethyl-5,5'-di isopropyl-3"-methoxy TPM | 1.0 | 259 | 42 | 8,420 | 415,000 |
| 1,1,1-((4,4',4"-trihydroxy-3-methoxy)-triphenyl)ethane | 1.0 | 218 | 47 | 18,400 | 478,000 |

[1] Triphenylmethane.

I claim:
1. An epoxide of the formula

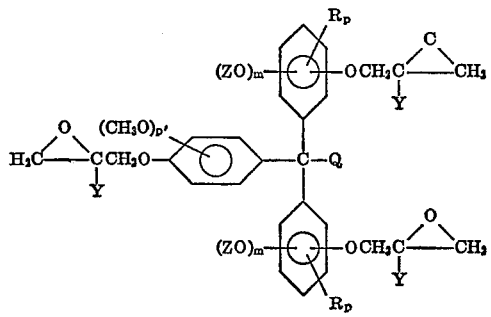

wherein Q is H or an alkyl of up to about 10 carbon atoms; each R is independently an alkyl of up to about 12 carbon atoms, methoxy, phenyl or cyclohexyl; each Y is independently H or —CH₃; H is H or

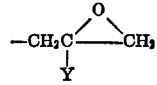

each $m$ is independently 0 or 1; each $p$ is independently 0 or 2; $p'$ is 1 or 2;

the above formula being subject to the following limitations— each $(CH_3O)_{p'}$ group may only be on a ring position meta to the point of attachment of the ring to the —CQ group;

each $R_p$— group may only be on a ring position meta to the points of attachment of the respective rings to the —CQ group; and each $(ZO)_m$ and glycidyloxy group may only be on a ring position ortho and/or para to the points of attachment of the respective rings to the —CQ group.

2. The compound of claim 1 wherein Q and Y are H, $p'$ is 1 and $m$ and $p$ each are 0.

3. Tris(3 - methoxy - 4 - (2,3 - epoxypropoxy)phenyl) methane.

No references cited.

NORMA S. MILESTONE, Primary Examiner

U.S. Cl. X.R.
260—47 EP, 47 EC, 47 EN, 830 TW, 613 R

UNITED STATES PATENT OFFICE
CERTIFICATE OF CORRECTION

Patent No. 3,787,451   Dated January 22, 1974

Inventor(s) R. W. Mah

It is certified that error appears in the above-identified patent and that said Letters Patent are hereby corrected as shown below:

In Columns 7 and 8, Table I, add footnote

— * triphenylmethane — .

In Colum 10, line 2, after semi-colon, delete "H" and insert

— Z — so it reads "Z is H or".

In Column 9, Claim 1, first formula should read

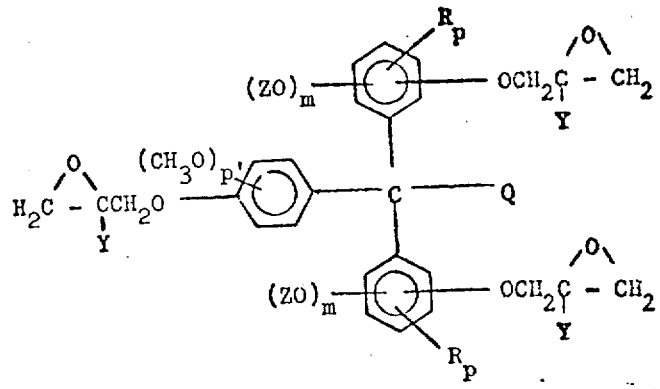

Signed and Sealed this twenty-third Day of March 1976

[SEAL]

Attest:

RUTH C. MASON
Attesting Officer

C. MARSHALL DANN
Commissioner of Patents and Trademarks